United States Patent
Aldrich et al.

(10) Patent No.: US 7,391,437 B2
(45) Date of Patent: Jun. 24, 2008

(54) IMAGE SENSOR INTERFACE

(75) Inventors: Bradley C. Aldrich, Austin, TX (US); Rajith K. Mavila, Austin, TX (US)

(73) Assignee: Marvell International Ltd., Hamilton (BM)

( * ) Notice: Subject to any disclaimer, the term of this patent is extended or adjusted under 35 U.S.C. 154(b) by 738 days.

(21) Appl. No.: 10/324,264

(22) Filed: Dec. 18, 2002

(65) Prior Publication Data

US 2004/0119844 A1 Jun. 24, 2004

(51) Int. Cl.
*H04N 5/225* (2006.01)
*H04N 9/04* (2006.01)
*H04N 5/235* (2006.01)
*H04N 5/228* (2006.01)
*H04N 3/14* (2006.01)
*H04N 5/335* (2006.01)

(52) U.S. Cl. .............................. 348/207.99; 348/222.1; 348/294; 348/374

(58) Field of Classification Search .................. 348/72, 348/294, 211.14, 207.99, 207.1, 207.11, 348/374, 222.1; 455/556.1, 556.2
See application file for complete search history.

(56) References Cited

U.S. PATENT DOCUMENTS

| | | | | |
|---|---|---|---|---|
| 4,527,205 A * | 7/1985 | Konishi | ...................... | 386/118 |
| 4,896,215 A * | 1/1990 | Morcom | ................. | 348/207.99 |
| 5,040,068 A * | 8/1991 | Parulski et al. | ............... | 348/376 |
| 5,221,964 A * | 6/1993 | Chamberlain et al. | ....... | 348/373 |
| 5,493,332 A * | 2/1996 | Dalton et al. | ........... | 348/207.99 |
| 5,666,137 A * | 9/1997 | Coelho et al. | ................ | 345/605 |
| 5,696,553 A * | 12/1997 | D'Alfonso et al. | ..... | 348/211.14 |
| 6,313,868 B1 * | 11/2001 | D'Alfonso et al. | ............. | 348/72 |
| 6,427,078 B1 * | 7/2002 | Wilska et al. | ............. | 455/550.1 |
| 6,446,155 B1 * | 9/2002 | Maggi et al. | ................. | 710/313 |
| 6,714,257 B2 * | 3/2004 | Roever | ....................... | 348/590 |
| 6,791,601 B1 * | 9/2004 | Chang et al. | ................... | 348/65 |
| 6,952,223 B2 * | 10/2005 | Terashita | .................. | 348/222.1 |
| 6,980,241 B2 * | 12/2005 | Aruga et al. | ................. | 348/241 |
| 6,992,694 B2 * | 1/2006 | Abe | ............................ | 348/72 |
| 7,164,438 B2 * | 1/2007 | Kindaichi | ................ | 348/207.1 |
| 2004/0119844 A1 * | 6/2004 | Aldrich et al. | ......... | 348/231.99 |

FOREIGN PATENT DOCUMENTS

JP 2003046878 A * 2/2003

* cited by examiner

*Primary Examiner*—Lin Ye
*Assistant Examiner*—Richard M Bemben

(57) ABSTRACT

A system includes an image sensor and an interface to receive image data from the image sensor. The interface selects between providing at least one synchronization signal to the image sensor and receiving the synchronization signal(s) from the image sensor. The synchronization signal(s) are associated with the communication of the image data from the image sensor.

61 Claims, 4 Drawing Sheets

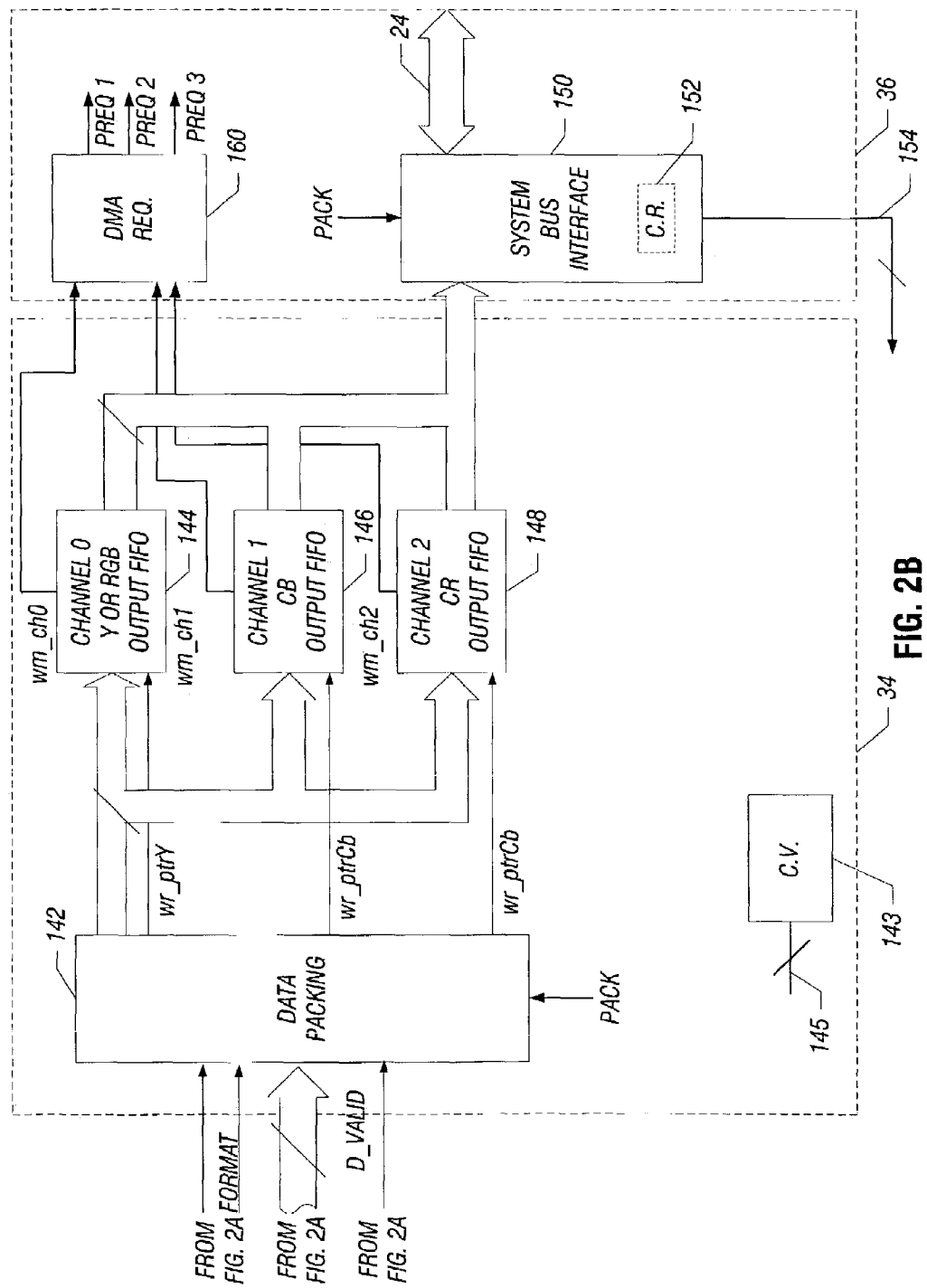

IMAGE SENSOR INTERFACE

BACKGROUND

The invention generally relates to an image sensor interface.

A typical digital imaging system, such as a digital camera, includes an image sensor to electrically capture an optical image. To accomplish this, the imager typically includes an array of photon sensing pixel cells. During an integration time, or interval, each pixel cell typically measures the intensity of a portion, or pixel, of a representation of the optical image that is focused (by optics of the camera) on to the array of pixel cells. The result of this electrical capture is a frame of image data that indicates the optical image.

A typical digital imaging system includes circuitry to receive the image data from the image sensor and process this data. For example, one such digital imaging system is a camera that may include circuitry to receive the image data from the image sensor and compress the image data before communicating the compressed image data to, for example, a computer that recreates captured video on a display of a computer. A digital imaging system may also be located inside a portable computing or communication device, such as a cellular telephone (for example) for purposes of capturing video images (via an image sensor) so that these images may be communicated by the device to a network (a cellular network, for example).

The components of a digital imaging system typically are designed for a specific image sensor, i.e., a certain part number from a specific manufacturer. Thus, the digital imaging system typically is designed and developed to be specific to and efficient for a particular image sensor. However, such an approach typically is inflexible for purposes of substituting other image sensors, as the processing capabilities, communication protocols, etc. typically vary among other image sensors having different part numbers and/or manufacturers.

Thus, there is a continuing need for better ways to accommodate a wide variety of image sensors in a particular digital imaging system.

DETAILED DESCRIPTION

Figure 1:
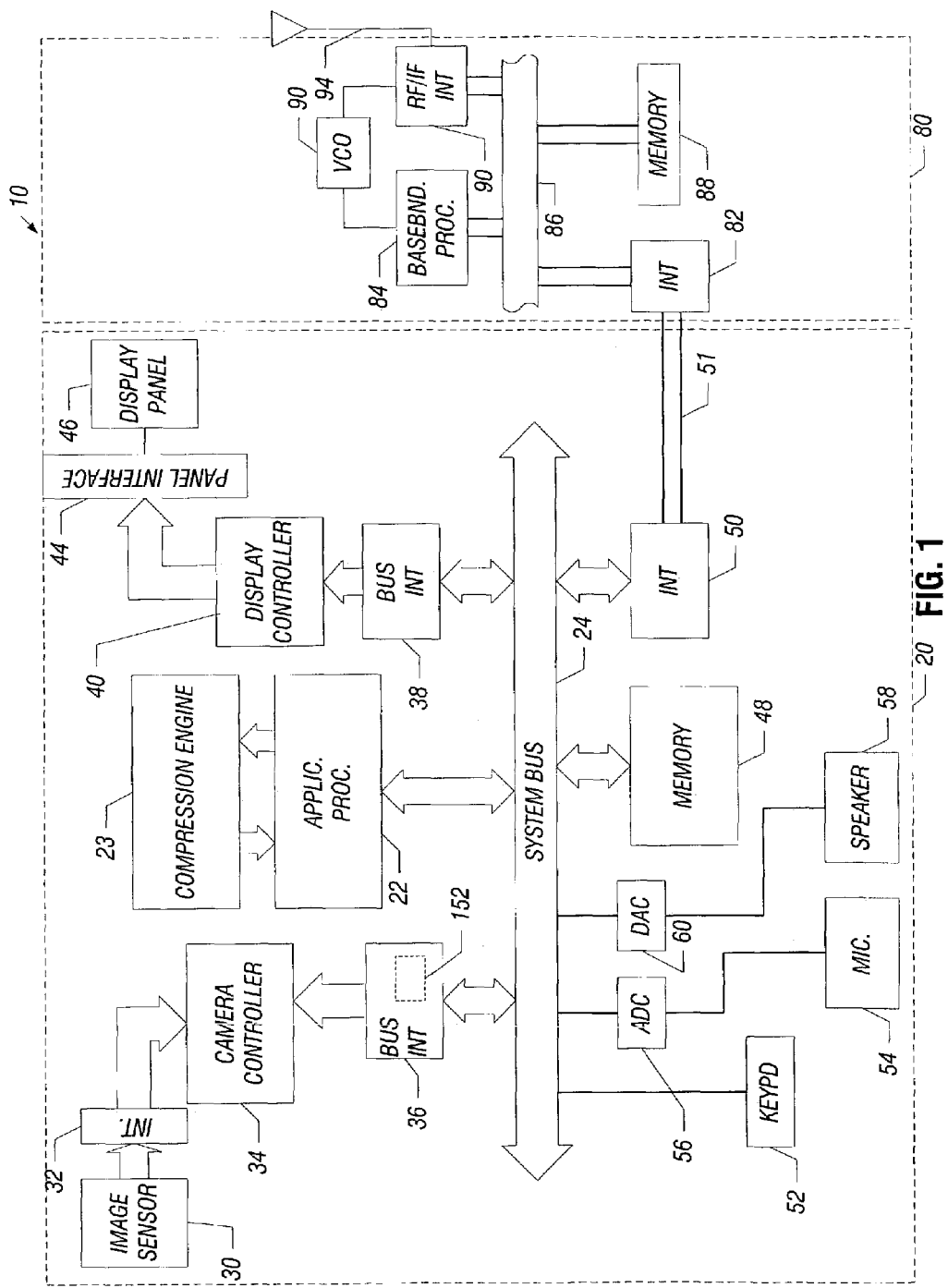
FIG. 1 is a block diagram of a portable computing or communication device according to an embodiment of the invention.

Referring to FIG. 1, an embodiment of a portable computing or communication device 10 (called a "portable device 10" herein) includes an application subsystem 20 and a communication subsystem 80. As an example, the portable device 10 may be a mobile communication device, such as a cellular telephone, a two-way radio communication system, a one-way pager, a two-way pager, a personal communication system (PCS), a personal digital assistant (PDA), a portable computer, etc.

In some embodiments of the invention, the application subsystem 20 may be used to provide features and capabilities that are visible or used by a user, such as, for example, email, calendaring, audio, video, gaming, etc. The communication subsystem 80 may be used to provide wireless and/or wire communication with other networks, such as, for example, cellular networks, wireless local area networks, etc.

In some embodiments of the invention, the application subsystem 20 includes an image sensor 30 for purposes of electrically capturing an optical image. For example, the image sensor 30 may be used by the application subsystem 20 as part of a digital imaging subsystem for purposes of capturing images of a video. As a more specific example, the portable device 10 may be a cellular telephone that captures images for purposes of transmitting these images over a cellular network.

For purposes of increasing the flexibility of the circuitry of the application subsystem 20 to accommodate a wide range of image sensors 30 having different part numbers and/or being associated with different manufacturers, the application subsystem 20 includes an image sensor interface 32. The image sensor interface 32 provides an interface between the image sensor 30 and the other components of the application subsystem 20. In particular, the image sensor interface 32 provides flexibility in adapting the particular configuration of the image sensor 30 to the other components of the application subsystem 20. More particularly, in some embodiments of the invention, the image sensor 30 may use one of a plurality of different communication techniques to communicate image data from the image sensor 30 to other components of the application subsystem 20.

For example, in some embodiments of the invention, synchronization signals are used to synchronize the communication of captured image data from the image sensor for purposes of indicating the end of horizontal lines of the image data, as well as indicating the end of frames of image data. Some image sensors 30 provide the synchronization signals, and other image sensors 30 receive the synchronization signals from the circuitry to which these image sensors 30 are coupled. To accommodate either scenario, in some embodiments of the invention, the image sensor interface 32 may be programmed (via one or more control registers 152 of the interface 32) to function according to whether the image sensor 30 functions as a master device (in a master mode) in which the image sensor 30 generates the synchronization signals or as a slave device (in a slave mode) in which the image sensor 30 receives the synchronization signals. Thus, in response to being placed in a master mode, the interface 32 receives synchronization signals from the image sensor 30, and in response to being placed in a slave mode, the interface 32 furnishes the synchronization signals to the image sensor 30.

The above-described synchronization signals are communicated, for example, on dedicated synchronization signal lines and are separate from the image data. However, for some image sensors 30, the synchronization signals are not external to the image data, but rather, are embedded within the image data. In this manner, for this type of image sensor 30, the image sensor 30 embeds synchronization signals within the image data. For example, in some embodiments of the invention, a particular image sensor 30 may embed start-of-active-video (SAV) and an end-of-active-video (EAV) signals in the image data. For this type of image sensor 30, the image sensor interface 32 may be programmed (via the configuration register(s) 152) so that the interface 32 detects these embedded synchronization signals in the image data to control the receipt of this image data from the image sensor 30 accordingly.

In some embodiments of the invention, a particular image sensor 30 may furnish the image data in a parallel fashion to the interface 32. However, a particular image sensor 30 may alternatively be configured to furnish the image data in a serial fashion (a cellular network, for example) by the communication subsystem 80. To accommodate both scenarios, in some embodiments of the invention, the interface 32 is programmable (via the control register(s) 152) to configure the interface 32 to either receive serial or parallel image data signals from the image sensor 30.

Therefore, to summarize, the interface 32 may be placed in one of at least six modes, depending on the particular image sensor 30 that is installed in the application subsystem 20: a master-parallel mode, a master-serial mode, a slave-parallel mode, a slave-serial mode, an embedded-parallel mode and an embedded-serial mode. The particular mode may be selected in some embodiments of the invention via a write operation of the appropriate bits to the configuration register(s) 152.

Among the other features of the application subsystem 20, in some embodiments of the invention, the subsystem 20 includes a camera controller 34 that receives image data from the interface 32. This camera controller 34, in turn, is coupled to a system bus 24 of the application subsystem 20 via a bus interface 36. The application subsystem 20 also includes an application processor 22 that, in turn, is coupled to the system bus 24 and a compression engine 23. As its name implies, the compression engine 23 compresses the image data so that the resultant compressed image data may be communicated to a network (a cellular network, for example) by the communication subsystem 80.

In some embodiments of the invention, the application subsystem 20 may include a display panel controller 40 (a liquid crystal display (LCD) controller, for example) that is coupled to the system bus 24 via a bus interface 38. The display panel controller 40, in turn, is coupled to a display panel 46 (an LCD panel, for example) via a panel interface 44. The application subsystem 20 may also include a memory 48 (a dynamic random access memory (DRAM) or a flash memory, as just a few examples) that is coupled to the system bus 24. As examples, the memory 48 may store program instructions for the application processor 22, as well as the image data received from the image sensor 30.

The application subsystem 20 may also include devices to interact with a user of the portable device 10, such as a keypad 52, a microphone 54 and a speaker 58. The microphone 54 may be coupled to the system bus 24 via an analog-to-digital converter (ADC) 56, and the speaker 58 may be interfaced to the system bus 24 via a digital-to-analog converter (DAC) 60.

The application subsystem 20 communicates with the communication subsystem 80, in some embodiments of the invention, over a communication link 51 via an interface 50 that is coupled to the system bus 24. In this manner, the interface 50 communicates with a corresponding interface 82 of the communication subsystem 80. As an example, the interfaces 50 and 82 may exchange packet data related to email communications, cellular telephone calls, etc.

In some embodiments of the invention, the communication subsystem 80 of the portable device 10 includes a baseband processor 84 that is coupled to a system bus 86 of the subsystem 80. The baseband processor 84 may be a digital signal processing (DSP) engine, for example, that establishes a particular communication standard with a network that is coupled to the portable device 10. The communication subsystem 80 may also include a memory 88 (a DRAM memory or a flash memory, as examples) that may store data that is communicated to and from the network to which the portable device 10 is coupled, along with possibly executable instructions for the baseband processor 84.

Also included in the communication subsystem 80, in some embodiments of the invention, is a radio frequency (RF)/intermediate frequency (IF) interface 92 that receives at least one oscillating signal from a voltage controlled oscillator (VCO) 90. The baseband processor 84 controls the VCO 90 to regulate the frequency(cies) of the oscillating signal(s). The RF/IF interface 92, in turn, is coupled to the system bus 86 and establishes an analog interface for the communication subsystem 80 to the network. For example, if the network is a wireless network, then the RF/IF interface 92, in some embodiments of the invention, establishes analog signals for purposes of communicating through an antenna 94. Other variations are possible.

Figure 2A:
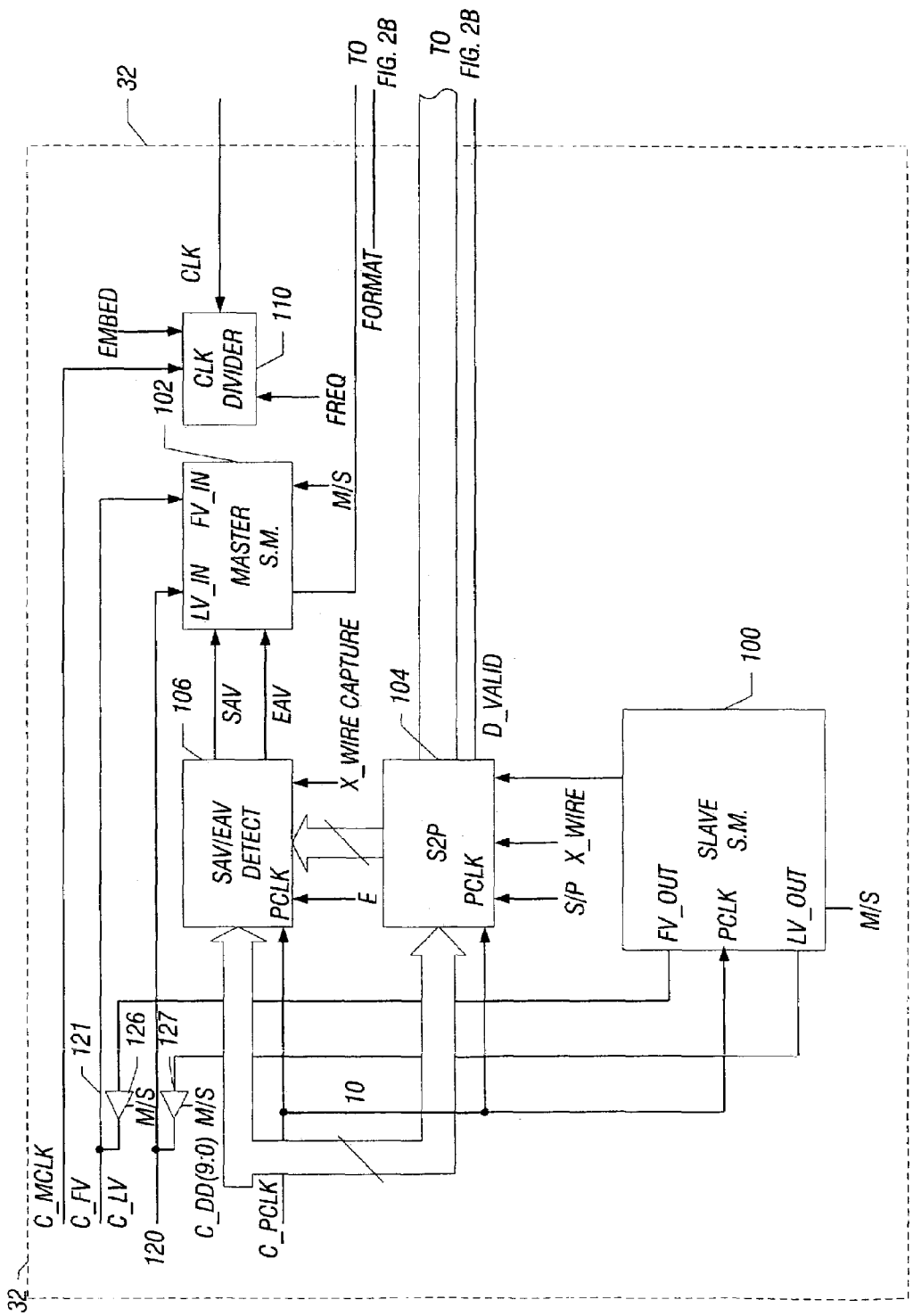
FIG. 2 is a block diagram of selected circuits of the system of FIG. 1 according to an embodiment of the invention.

FIG. 2 depicts a more detailed schematic diagram of selected circuits of the portable device 10. In particular, FIG. 2 depicts more detailed block diagrams of the interface 32, the controller 34 and bus interface 36, in accordance with some embodiments of the invention. As shown, the interface 32 includes a slave state machine 100 that is activated (via a signal called M/S) in response to the image sensor 30 being a slave device so that the image sensor 30 receives external synchronization signals. More specifically, the slave state machine 100 provides signals called C_FV and C_LV on synchronization lines 121 and 120, respectively, when the image sensor 30 is operating as a slave and receives the synchronization signals. The C_FV signal is asserted (driven high, for example) to indicate the start of a particular frame that is captured by the image sensor 30, and the C_LV signal is asserted (driven high, for example) to indicate the start of a particular line of image data that is provided by the image sensor 30.

For purposes of selectively blocking the output terminals of the slave state machine 100 so that the slave state machine 100 only furnishes signals to the communication lines 120 and 121 during the appropriate slave mode, the interface 32 includes tri-state buffers 126 and 127 that are coupled between the slave state machine 100 and the lines 121 and 120, respectively. In this manner, in response to the slave mode (i.e., in response to the M/S being de-asserted (driven low, for example)), the tri-state buffers 126 and 127 are activated to couple the output terminals of the slave state machine 100 to the synchronization lines 120 and 121.

In some embodiments of the invention, for purposes of controlling the master mode, the interface 32 includes a master state machine 102. Instead of generating signals for the lines 120 and 121, the master state machine 102 receives the C_FV and C_LV signals from the lines 121 and 120, respectively. In this manner, when the M/S signal is asserted to indicate the master mode, the master state machine 102 asserts a signal (called CAPTURE) to indicate when a data packing circuit 108 of the interface 32 is to capture image data.

For purposes of permitting flexibility for either serial or parallel transfers of the image data, the interface 32 includes a serial-to-parallel interface 104 that is coupled to receive signals (called C_DD [9:0]) that indicate the image data from the image sensor. It is noted that not all ten signals may be used to indicate the image data for a particular image sensor 30. In this manner, four or five bits may be used to communicate the image data if the image sensor 30 uses a serial mode of communication, in some embodiments of the invention; and nine or ten of the C_DD [9:0] signals may be used to communicate the image data for parallel communications from the image sensor 30. The interface 104 receives a signal (called S/P) that is asserted/deasserted to indicate either the serial mode or the parallel mode. The selection of the number of image signals and the serial or parallel transfer mode is controlled by bits from the control register(s) 152. Thus, based on the serial or parallel transmission mode from the image sensor 30 and the number of bits used to communicate this data, the serial-to-parallel interface 104 provides bits of data to the data packing circuit 108.

Among the other features of the interface 32, in some embodiments of the invention, the interface 32 includes an SAV/EAV detection circuit 106 that is activated when the appropriate bits in the control register(s) 152 indicate that the synchronization signals are embedded in the image data. When activated, the detection circuit 106 asserts a SAV signal to the master state machine 102 in response to detecting the SAV signal in the embedded image data and asserts an EAV signal to the master state machine 102 in response to detecting the EAV signal embedded in the image data. The interface 32 also includes, in some embodiments of the invention, a clock divider 110 that receives a system clock signal and adjusts its frequency according to a program value to produce a corresponding clock signal called C_MCLK (on a clock line 111) to the image sensor 30.

In some embodiments of the invention, the interface 32 may control operation of the clock divider 110 for purposes of turning off a clock signal (CLK) of the image sensor 130 during idle times for purposes of conserving power. Furthermore, in some embodiments of the invention, the clock divider 110 may be controlled (via bits of the control register 152, for example) to control the frequency of the CLK signal for purposes of power management. In general, a higher clock frequency means more power consumption or dissipation and a lower clock frequency means less power consumption or dissipation. Thus, the frequency of the CLK signal may be controlled to control the power that is consumed by the portable device 10.

More specifically, in some embodiments of the invention, in response to a power management event, the application processor 22 (FIG. 1) may write to the control register 152 to scale back the frequency of the CLK clock signal to reduce power consumption. As an example, this power management event may be attributable to a state of a battery that powers the device 10. For example, in response to the recognition that the stored energy in the battery has reached some threshold level, the application processor 22 may throttle back the frequency of the CLK signal to reduce power consumption by the device 10. Adjusting the clock frequency may also prompt the change of the integration time used by the image sensor 30 to capture images. Thus, upon changing the frequency of the CLK signal, the application processor 20 may also communicate with the image sensor 30 for purposes of increasing the integration time. Such an increase may improve the quality of captured images, in some embodiments of the invention.

Other variations in the structure and functions of the interface 32 are possible.

In some embodiments of the invention, the data packing circuit 108 may be used for purposes of planarizing image data. When planarized, the color value for each pixel is stored in an associated buffer. For example, for a red green blue (RGB) color space, the red color values are stored in one array, the green color values are stored in another array and the blue color values are stored in another array.

This planarization by the data packing circuit 108 facilitates processing of the image data for processing by parallel execution resources. Such processing may include the execution of single instruction multiple data (SIMD) instructions, for example, to perform color interpolation, image scaling, color space conversion, video compression, motion estimation algorithms, etc.

Figure 3:
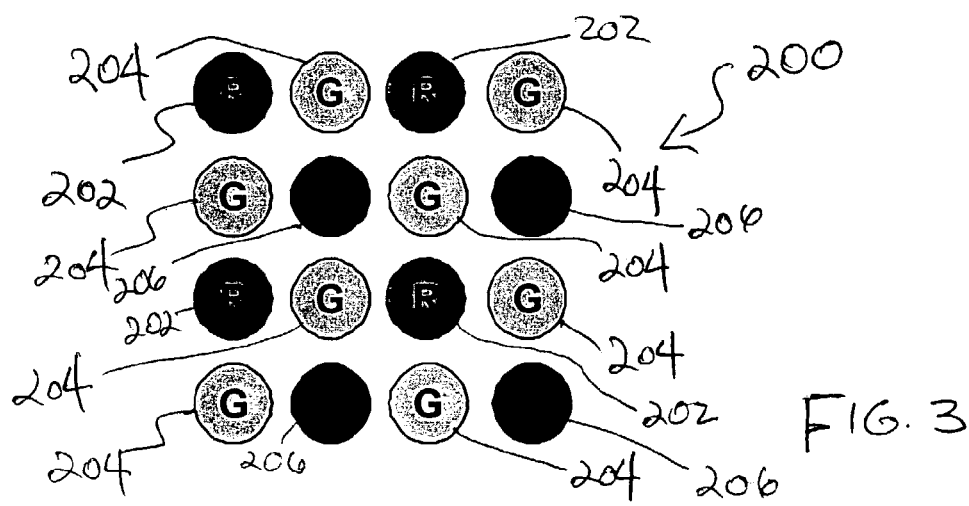
FIG. 3 is a schematic diagram of an array of pixel cells according to an embodiment of the invention.

As an example of color interpolation, FIG. 3 depicts an exemplary array 200 of pixel cells that are arranged in a red green green blue (RGGB) Bayer pattern. The array 200 includes pixel cells 202 that sense red intensities, pixel cells 204 that sense green intensities and pixel cells 206 that sense blue intensities. Thus, each pixel cell only senses one primary color. It is desirable to obtain, however, red, green and blue color values for each pixel cell location. To accomplish this, color interpolation is used to derive the two missing color components for each pixel cell location. Therefore, each pixel location is associated with one red, two green and one blue color components. Each one of these color components may be stored in a separate memory array due to the above-described planarization. The result of the color interpolation is depicted in FIG. 4.

Figure 4:
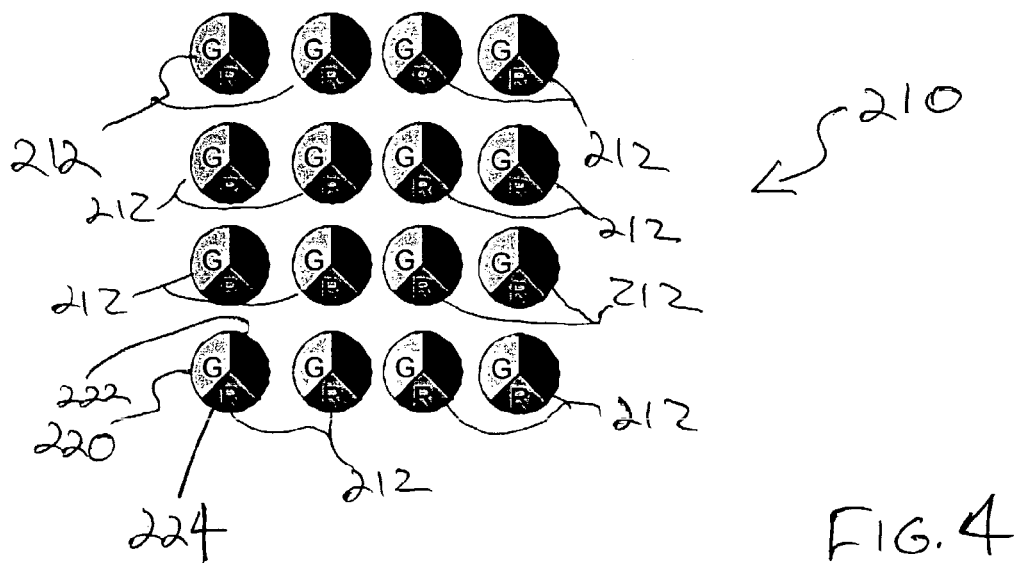
FIG. 4 is an illustration of synthesized pixel color values according to an embodiment of the invention.

Referring to FIG. 4, the color interpolation produces three color components for each pixel cell location, represented by the referenced numeral "212." Thus, each location 212 is associated with a red pixel color component 224, a green pixel color component 222 and a blue pixel color component 220.

As another example of the planarization, the color data may be represented in a YCbCr color space. In the planar format, the data packing circuit 108 stores the Y, Cb and Cr components in three separate arrays.

As an example using the YCbCr color space format, the data packing circuit 108 receives the image data from the bus 130 and stores the Y component of the image data in a FIFO memory buffer 144, stores the Cb component of the image data in a Cb memory FIFO 146 and stores the Cr component of the image data in a Cr memory FIFO 148. These three FIFOs 144, 146 and 148, in turn, are coupled to the system bus interface 150 of the interface 32. For purposes of communicating the Y, Cb and Cr data to the system bus 24, the bus interface 36, in some embodiments of the invention, includes a DMA requestor 160. In this manner, the DMA requestor 160 asserts one of three request signals for purposes of allocating a DMA channel to transfer a particular Y, Cb or Cr packet of data to the memory 48. Other variations are possible.

Besides planarizing the image data, in some embodiments of the invention, the data packing circuit 108 may perform pixel format conversions. For example, in some embodiments of the invention, the data packing circuit 108 may be configured (via bits in the configuration register 152, for example) to perform a conversion from a pre-processed pixel format red green blue (RGB) 8:8:8 (i.e., "eight bytes blue component: eight bytes green component: eight bytes blue component") to red green blue transparent (RGBT) 8:8:8, RGB 6:6:6, RGB 5:6:5, RGBT 5:5:5, and RGB 4:4:4 to allow devices that support full image processing chains to be easily formatted for LCD Controller RGB pixel formats. The conversion may involve a scaling operation for each of the color components. For example, the format conversion from RGB 8:8:8 to RGBT 5:5:5, the five most significant bits of each of the red, green, and blue color are combined into a 16 bytes per pixel (bpp) format.

The communication of transparency information is accomplished via an extra bit created by the format conversion. For example, the RGB5:6:5 format is a 16 bpp format used for display panels. The conversion of data in this format into a RGBT 5:5:5 format generally decreases the precision of the green channel from 6-bits to 5-bits and permits the transparency to be programmed into one of the extra bits, such as bit 16. This is useful when the LCD controller 40 has several planes or overlays to work with, and uses a transparency bit for determining how to combine them.

Among its other features, the controller 34, in some embodiments of the invention, includes a control unit 143 that coordinates the above-described activities related to communicating image data from the image sensor to the memory 48 and controlling the capture of the image data via communication lines 145.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A system comprising:
   an image sensor; and
   an interface that has a master mode associated with receiving at least one synchronization signal from the image sensor and a slave mode associated with sending said at least one synchronization signal to the image sensor and transfers image data directly between said image sensor and a device of the system, wherein said interface receives said image data from the image sensor and wherein said at least one synchronization signal is associated with the communication of the image data from the image sensor,
   wherein said image sensor and said interface are included as part of a mobile communication device.

2. The system of claim 1, wherein the interface changes a format of the image data.

3. The system of claim 1, wherein the interface inserts transparency information into the image data.

4. The system of claim 1, wherein the interface separates the image data into different associated arrays, each array being associated with a different pixel color.

5. The system of claim 1, wherein said at least one synchronization signal is communicated with the image data.

6. The system of claim 5, wherein said at least one synchronization signal comprises at least one of a start of video content signal and an end of video content signal.

7. The system of claim 1, wherein said at least one synchronization signal comprises a signal separate from the image data.

8. The system of claim 7, wherein said at least one synchronization signal comprises at least one of a frame synchronization signal and a line synchronization signal.

9. The system of claim 1, wherein interface is further adapted to select between receiving the image data from the image sensor in a serial or parallel fashion.

10. The system of claim 1, wherein the system forms part of a cellular telephone.

11. The system of claim 1, wherein the system forms part of a personal digital assistant.

12. The system of claim 1, further comprising:
    at least one register to program the interface to select between providing at least one synchronization signal to the image sensor and receiving said at least one synchronization signal from the image sensor.

13. The system of claim 1, further comprising:
    another interface to unpack the image data into separate arrays for separate color components associated with the image data.

14. The system of claim 13, wherein the arrays are associated with different color components of a YCbCr color space.

15. The system of claim 1, further comprising:
    a circuit to convert the image data between a planar format and a packed format.

16. The system of claim 15, wherein the image data is associated with a YCbCr color space.

17. The system of claim 1, further comprising:
    a circuit to regulate a frequency of a clock signal provided by the interface to the image sensor to regulate a power consumption by the system.

18. A system comprising:
    an image sensor that operates in either a master mode or a slave mode;
    an interface to receive image data from the image sensor, transfer said image data directly between said image sensor and a device of the system, and select between providing at least one synchronization signal to the image sensor and receiving said at least one synchronization signal from the image sensor based on operating mode of said image sensor, said at least one synchronization signal being associated with the communication of the image data from the image sensor; and
    a flash memory to store the image data,
    wherein said image sensor and said interface are included as part of a mobile communication device.

19. The system of claim 18, wherein said at least one synchronization signal is communicated with the image data.

20. The system of claim 19, wherein said at least one synchronization signal comprises at least one of a start of video content signal and an end of video content signal.

21. The system of claim 18, wherein said al least one synchronization signal comprises a signal separate from the image data.

22. The system of claim 21, wherein said at least one synchronization signal comprises at least one of a frame synchronization signal and a line synchronization signal.

23. The system of claim 18, wherein interface is further adapted to select between receiving the image data from the image sensor in a serial or parallel format.

24. A method comprising:
    receiving image data from an image sensor; and
    operating in an operating mode selected from a master mode or a slave mode;
    storing an indication in a memory to select between providing at least one synchronization signal to the image sensor and receiving said at least one synchronization signal from the image sensor based on said operating mode, said at least one synchronization signal being associated with the communication of the image data directly from the image sensor to a device of the systems,
    wherein receiving said image data, providing said at least one synchronization signal to the image sensor, and receiving said al least one synchronization signal from the image sensor are performed within a mobile communication device.

25. The method of claim 24, wherein said at least one synchronization signal is communicated with the image data.

26. The method of claim 25, wherein said at least one synchronization signal comprises at least one of a start of video content signal and an end of video content signal.

27. The method of claim 24, wherein said at least one synchronization signal comprises a signal separate from the image data.

28. The method of claim 27, wherein said at least one synchronization signal comprises at least one of a frame synchronization signal and a line synchronization signal.

29. The method of claim 24, wherein interface is further adapted to select between receiving the image data from the image sensor in a serial or parallel fashion.

30. The system of claim 1 wherein said interface selects between said master mode and said slave mode based on an operating mode of said image sensor.

31. The system of claim 1 wherein said image sensor is a device selected from at least one of a master device and a slave device.

32. The system of claim 1 wherein said interface comprises a master device that is enabled to receive said at least one synchronization signal from said image sensor when operating in said master mode.

33. The system of claim 1 wherein said interface comprises a slave device that is enabled to generate and send said at least one synchronization signal to said image sensor when operating in said slave mode.

34. A system comprising:
an image sensor that operates in only one of either a first mode or a second mode; and
an interface that receives a synchronization signal from said image sensor when operating in said first mode or sends said synchronization signal to said image sensor when operating in said second mode,
wherein said interface operates as a master device when in said first mode and as a slave device when in said second mode,
wherein said interface receives image data from the image sensor and transfers said image data directly between said image sensor and a device of the system,
wherein said synchronization signal is associated with the communication of the image data from the image sensor, and
wherein said image sensor and said interface are included as part of a mobile communication device.

35. The system of claim 34 wherein said interface operates in a third mode, said interface receiving said image data from said image sensor based on said third mode.

36. The system of claim 34 wherein said interface operates in at least one of a master-parallel mode, a master-serial mode, a slave-parallel mode, a slave-serial mode, an embedded-parallel mode and an embedded-serial mode based on an operating mode of said image sensor.

37. The system of claim 34 wherein said image sensor in operating in either said first mode or said second mode operates in either a master mode or a slave mode.

38. The system of claim 34 wherein said synchronization signal originates in said image sensor and is feedforward to said interface.

39. The system of claim 34 wherein said interface generates a capture signal to receive said image data based on a master/slave signal.

40. The system of claim 34 wherein said interface operates in said first mode based on a master/slave signal.

41. The system of claim 1 wherein said device includes a controller.

42. The system of claim 1 wherein said image sensor includes a pixel array that generates said image data,
wherein said interface receives said synchronization signal from said pixel array when in said master mode and sends said at least one synchronization signal to said pixel array when in said slave mode.

43. The system of claim 1 further comprising:
a controller that receives said image data from said first interface; and
a second interface that transfers said image data from said controller to a baseband processor.

44. The system of claim 43 further comprising a radio frequency interface that is in communication with said baseband processor and that wirelessly transmits analog signals via an antenna to communicate said image data to a network.

45. A mobile communication device comprising the system of claim 44.

46. The system of claim 1 wherein said interface is separate from said image sensor.

47. The system of claim 1 wherein said interface comprises:
a master device that is enabled to receive said at least one synchronization signal from said image sensor when operating in said master mode; and
a slave device that is enabled to generate and send said at least one synchronization signal to said image sensor when operating in said slave mode.

48. The system of claim 47 wherein said image sensor generates a start of frame signal, and
wherein said master device generates a capture signal based on said start of frame signal.

49. The system of claim 47 wherein said slave device generates a start of frame signal, and
wherein said master device generates a capture signal based on said start of frame signal.

50. The system of claim 47 wherein said image sensor generates a line of image data signal, and
wherein said master device generates a capture signal based on said line of image data signal.

51. The system of claim 47 wherein said slave device generates a line of image data signal, and
wherein said master device generates a capture signal based on said line of image data signal.

52. The system of claim 47 further comprising buffers that are coupled between said slave device and said image sensor and that selectively block outputs of said slave device when in said slave mode.

53. The system of claim 1 wherein said interface comprises a serial-to-parallel interface that selectively provides said image data to a controller in one of a serial format and a parallel format.

54. The system of claim 1 wherein said interface comprises a detection circuit that indicates when said synchronization signal is embedded in said image data.

55. The system of claim 54 wherein said interface comprises a master device that is enabled to receive said at least one synchronization signal from said image sensor when operating in said master mode, and
wherein said master device generates a capture signal based on said indication by said detection circuit of when said synchronization signal is embedded in said image data.

56. The system of claim 54 said detection circuit indicates when at least one of a start of active video signal and an end of active video signal is embedded in said image data.

57. The system of claim 1 further comprising a controller that receives said image data from said interface,
wherein said controller comprises:
a data packing circuit that planarizes said image data; and
a plurality of first-in-first-out memories that each store a color component of said image data.

58. A mobile communication system comprising:
a controller that generates a master/slave signal;
an interface that operates in one of a first mode and a second mode based on said master/slave signal,
wherein mid interface, when in said first mode, is configured to receive a first synchronization signal from a first image sensor that operates as a master and to receive image data from said first image sensor in association with said first synchronization signal, and wherein mid interface, when in said second mode, is configured to send a second synchronization signal to a second image sensor that operates as a slave and to receive image data from said second Image sensor in association with said second synchronization signal.

59. The mobile communication system of claim 58 further comprising at least one of the first and second image sensors.

60. The mobile communication system of claim 58 wherein said controller and said interface are pe(t of a mobile communication device.

61. The mobile communication system of claim 58 wherein said interface, when in a master mode, is configured to receive said first synchronization signal from a first pixel array, and wherein said interface, when in a slave mode, is configured to send said second synchronization signal to a second pixel any.

* * * * *

UNITED STATES PATENT AND TRADEMARK OFFICE
CERTIFICATE OF CORRECTION

PATENT NO. : 7,391,437 B2
APPLICATION NO. : 10/324264
DATED : June 24, 2008
INVENTOR(S) : Bradley C. Aldrich et al.

It is certified that error appears in the above-identified patent and that said Letters Patent is hereby corrected as shown below:

| | |
|---|---|
| Column 10, Line 52 | Insert -- wherein -- after "54" |
| Column 10, Line 66 | Delete "mid" and insert -- said -- after "wherein" |
| Column 11, Line 4 | Delete "mid" and insert -- said -- after "wherein" |
| Column 12, Line 2 | Delete "pe(t" and insert -- part -- |
| Column 12, Line 10 | Delete "any" and insert -- array -- |

Signed and Sealed this

Thirtieth Day of September, 2008

JON W. DUDAS
*Director of the United States Patent and Trademark Office*